United States Patent [19]

Fukuyo et al.

[11] 4,135,405
[45] Jan. 23, 1979

[54] ROTATION DISPLAYING DEVICE

[75] Inventors: Junji Fukuyo; Chiharu Kanbe; Yasuaki Ohike; Tuneji Oguri, all of Shimada, Japan

[73] Assignee: Yazaki Sogyo Kabushiki Kaisha, Tokyo, Japan

[21] Appl. No.: 788,619

[22] Filed: Apr. 18, 1977

[30] Foreign Application Priority Data

May 6, 1976 [JP] Japan .......................... 51-56125[U]
May 24, 1976 [JP] Japan .......................... 51-65341[U]
May 24, 1976 [JP] Japan .......................... 51-59082[U]

[51] Int. Cl.$^2$ .............................................. G01P 3/18
[52] U.S. Cl. ........................................ 73/499; 73/535
[58] Field of Search ............... 73/499, 535, 539, 540, 73/548; 116/37, 57, 114 AJ, 115, 116, 129 E, 74

[56] References Cited

U.S. PATENT DOCUMENTS

| 620,723 | 3/1899 | Sharples | 73/535 |
| 2,698,215 | 12/1954 | Peck | 73/535 X |
| 2,941,049 | 6/1960 | Begian | 73/537 |

Primary Examiner—James J. Gill
Attorney, Agent, or Firm—Oldham, Oldham, Hudak & Weber Co.

[57] ABSTRACT

A rotation displaying device for displaying the rotating speed of an engine, especially, that of an agricultural machine such as a combine harvester, in colors classified by the low speed, standard speed and high speed. The device comprises a rotary shaft rotating at a speed proportional to the rotating speed of the engine, and a color pattern plate urged in one direction by the centrifugal force produced by the rotation of the rotary shaft. The color pattern plate is provided on its surface with a pattern of three different colors, and the color pattern changing with the successive displacement of the color pattern plate is viewed through a single central displaying opening of a display plate to display the low speed, standard speed and high speed of the engine.

2 Claims, 12 Drawing Figures

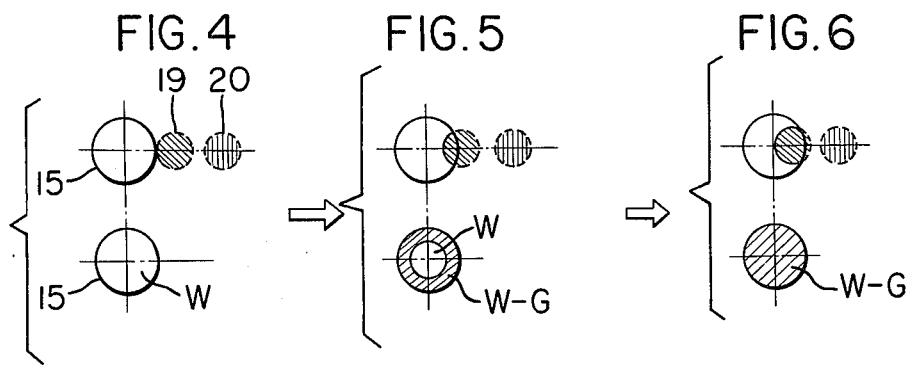
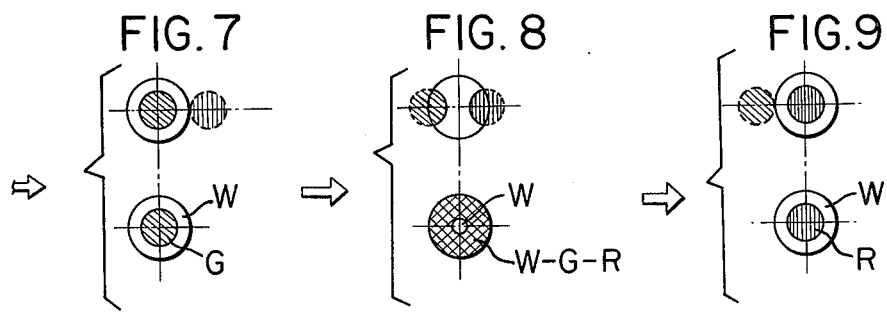
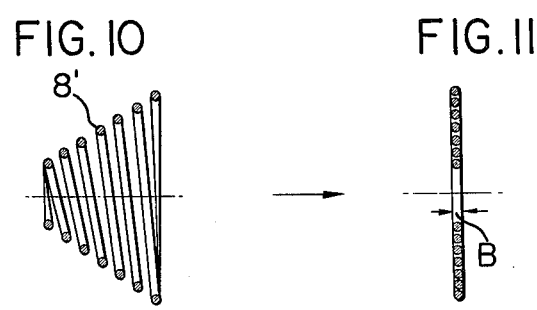
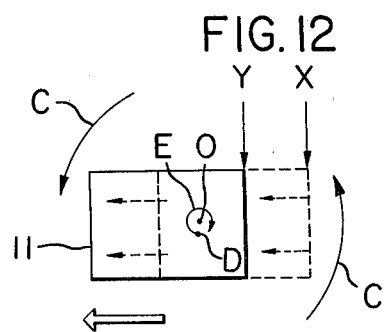

4,135,405

ROTATION DISPLAYING DEVICE

BACKGROUND OF THE INVENTION

The invention relates to a rotation displaying device, and more particularly to a device for displaying the rotating speed of an engine, for example, that of an agricultural machine such as a combine harvester by a color pattern, so that the machine operator can readily detect that the engine is rotating at its low speed, standard speed or high speed.

A rotation displaying device having a pointer moving in proportional relation to the rotating speed of an engine is commonly conventionally used as a means for indicating the rotating speed of the engine. While such a device can indicate the momentary rotating speed of the engine by the pointer, it is relatively awkward to immediately read the momentary value of the rotating speed of the engine due to the necessity for visually confirming the reading of the momentary rotating speed of the engine being indicated by the pointer on the rotation displaying device. Further, the machine operator may not readily identify that the thus read indication of the rotating speed of the engine belongs to its low speed, standard speed or high speed, and failure to make accurate judgement on the indicated speed for the engine may sometimes lead to a very dangerous situation.

SUMMARY OF THE INVENTION

It is therefore a primary object of the present invention to provide a novel rotation displaying device for displaying the rotating speed of an engine, especially, that of an agricultural machine such as a combine harvester, in colors classified by its low speed, standard speed and high speed, since in such an agricultural machine, accurate judgment on the rotating speed range of the engine is requested rather than the indication by the pointer of the momentary rotating speed of the engine during machine operation.

In the present invention, a color display changing according to the low speed, standard speed and high speed of the engine is employed so that the operator can accurately and immediately detect the rotating speed range of the engine and can therefore safely drive the machine.

It is to be understood that the present invention is in no way limited to its specific application to an agricultural machine such as a combine harvester, and the present invention is similarly effectively applicable to a color display of the low speed, standard speed and high speed of automobile engines and any other rotary bodies.

In accordance with the present invention, there is provided a rotation displaying device comprising a rotary shaft rotating at a speed proportional to the rotating speed of a rotary body such as an engine, a horizontal rod supported by a rotary plate mounted on one end of the rotary shaft to extend in orthogonal relation to the axis of the rotary shaft, a color pattern plate mounted slidably on the horizontal rod through spring means to make sliding movement along the horizontal rod by being urged by the centrifugal force produced as a result of rotation of the rotary shaft, and a display plate disposed in parallel to the color pattern plate and having a single central displaying opening, the color pattern plate being provided on its surface with a pattern of three different colors representing a first speed, a second speed and a third speed respectively of the rotary body, whereby the rotating speed of the rotary body is displayed by the change in the color pattern viewed through the single displaying opening of the display plate.

Preferred embodiments of the present invention will be described in detail with reference to the accompanying drawings.

BRIEF DESCRIPTION OF THE DRAWINGS

FIGS. 4 through 9 illustrate how a pattern of three different colors painted on a color pattern plate to be viewed through a displaying opening of the display plate changes relative to the rotating speed of an engine in the device of the present invention.

FIGS. 10 and 11 show two different states of a modification of a spring employed in the device of the present invention.

FIG. 12 illustrates a manner of providing a standard-speed or high-speed display mark on the color pattern plate.

DESCRIPTION OF THE PREFERRED EMBODIMENTS

Figure 1:
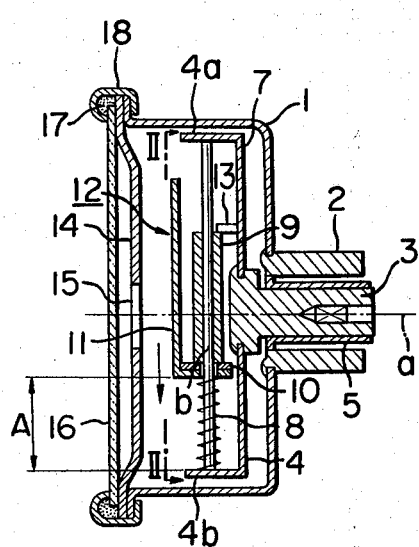
FIG. 1 is a vertical sectional view of an embodiment of the rotation displaying device according to the present invention.
Figure 2:
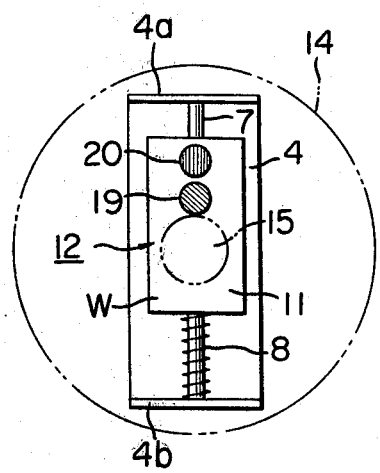
FIG. 2 is a plan view taken along the line II—II in FIG. 1.

Referring to FIGS. 1 and 2, the rotation displaying device according to the present invention comprises a casing 1 having a circular cross-sectional shape. A hollow hub 2 is securely fixed in a central opening of the bottom portion of this casing 1. A rotary shaft 3 is rotatably journaled in a bearing 5 disposed in this hollow hub 2. A rotary plate 4 is fixedly mounted on one end of the rotary shaft 3 for coaxial rotation with the rotary shaft 3 within the casing 1. The rotary plate 4 comprises a pair of supporting lugs 4a and 4b formed by bending its opposite end portions upward in parallel relation to the axis a of the rotary shaft 3. A horizontal rod 7 is mounted between these supporting lugs 4a and 4b to extend in orthogonal relation to the axis a of the rotary shaft 3, and a sliding pipe 9 is mounted on this horizontal rod 7 together with a cylindrical spring 8. A color pattern plate 11 in the form of an L is fixed to the sliding pipe 9 with a balancing member 10 interposed therebetween. Aligned holes are bored in the balancing member 10 and the short arm of the color pattern plate 11 to mount these elements 10 and 11 on the horizontal rod 7 so as to be slidable along the horizontal rod 7. The long arm of the color pattern plate 11 is positioned to extend in parallel to the horizontal rod 7, and while paint is coated on the entire upper surface of the long arm of the color pattern plate 11 to provide a white background (W) for indicating a first or low speed of a rotary body such as an engine of a combine harvester. A green mark 19 and a red mark 20 are provide in this white background (W) on the color pattern plate 11 to indicate a second or standard speed and a third or high speed respectively of the engine.

Figure 3:
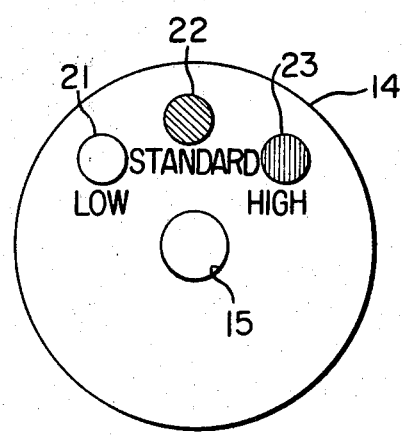
FIG. 3 is a plan view of a display plate preferably employed in the device of the present invention.

The sliding pipe 9, the balancing member 10 and the color pattern plate 11 constitute a unit which is referred to hereinafter as a movable unit 12. The movable unit 12 is normally urged toward the supporting lug 4a of the rotary plate 4 by the spring 8, and a stopper 13 is fixed to a suitable portion of the rotary plate 4 so that the center of gravity b of the movable unit 12 is located at a position which is biased toward the spring 8 relative to the axis a of the rotary shaft 3 as shown. A display plate 14 is disposed above the color pattern plate 11 and has a single central displaying opening 15 whose center aligns with the axis a of the rotary shaft 3. A transparent plate 16 of glass or plastic material is disposed above the display plate 14 with a suitable distance therebetween. The display plate 14 and transparent plate 16 are fixedly clamped in the upper opening of the casing 1 by means of a packing 17 and a clamping member 18. The display plate 14 is provided on its upper surface with a white mark 21, a green mark 22 and a red mark 23, and letters "LOW", "STANDARD" and "HIGH" are depicted beneath these marks 21, 22 and 23 respectively as best shown in FIG. 3.

The operation of the rotation displaying device having a structure as shown in FIGS. 1 and 2 will be described with reference to FIG. 4.

The rotary shaft 3 of the rotation displaying device having such a structure is connected to the engine (not shown) by a flexible wire or shaft (not shown). Transmission of the rotation of the engine through the flexible wire causes corresponding rotation of the rotary shaft 3 at a speed proportional to the rotating speed of the engine, and the rotary plate 4 fixed to one end of the rotary shaft 3 supported in the hub 2 rotates with the rotary shaft 3. The movable unit 12 has its center of gravity located at the position b which is biased toward the spring 8 relative to the axis a of the rotary shaft 3. Thus, with the rotation of the rotary plate 4, the movable unit 12 is urged by the centrifugal force to move along the horizontal rod 7 in a direction as shown by the arrow in FIG. 1 against the force of the spring 8, and the moving distance of the movable unit 12 is proportional to the rotating speed of the rotary shaft 3. With this movement of the movable unit 12 along the horizontal rod 7 by being urged by the centrifugal force, a color pattern as described below appears in the displaying opening 15 of the display plate 14.

Referring to FIG. 4a, the white background (W) coated on the upper surface of the color pattern plate 11 is only seen through the displaying opening 15 of the display plate 14 in the state in which the rotary shaft 3 is not rotating, since in this state the movable unit 12 is forced against the stopper 13 by the spring 8 due to the absence of the centrifugal force.

When the rotary shaft 3 starts to rotate gradually, the centrifugal force starts to act upon the movable unit 12, and the movable unit 12 is urged in the direction of the arrow in FIG. 1 along the horizontal rod 7 against the force of the spring 8 until part of the green mark 19 painted on the color pattern plate 11 appears in the displaying opening 15 of the display plate 14 in overlapping relation with the white background (W). Referring to FIG. 4b illustrating such a state, a small circle of white background (W) and a large circle of a color mixture of white and green (W-G) are displayed in concentric relation in the displaying opening 15 of the display plate 14 since the movable unit 12 is under rotation.

The end of the green mark 19 registers with the center of the displaying opening 15 as the rotating speed of the rotary shaft 3 is further increased. Referring to FIG. 4c illustrating such a state, a circle of a color mixture of white and green (W-G) is solely displayed in the displaying opening 15 of the display plate 14.

The center of the green mark 19 registers with the center of the displaying opening 15 as the rotating speed of the rotary shaft 3, hence, the rotating speed of the engine is further increased up to the rated speed. Referring to FIG. 4d illustrating such a state, the green mark 19 is completely displayed in the displaying opening 15 of the display plate 14 to indicate the fact that the engine is rotating at the standard speed.

The movable unit 12 is further urged in the direction of the arrow in FIG. 1 against the force of the spring 8 as the rotating speed of the rotary shaft 3 is further increased, and part of the red mark 20 starts to appear in the displaying opening 15 of the display plate 14. Referring to FIG. 4e illustrating such a state, a small circle of white background (W) and a large circle of a color mixture of white, green and red (W-G-R) appear in concentric relation in the displaying opening 15 of the display plate 14.

The center of the red mark 20 registers with the center of the displaying opening 15 of the display plate 14 when the rotating speed of the rotary shaft 3, hence, the rotating speed of the engine is increased beyond the standard speed. Referring to FIG. 4f illustrating such a state, the red mark 20 is completely displayed in the displaying opening 15 of the display plate 14 to indicate the fact that the engine is rotating at its high speed.

A conical spring 8' as shown in FIG. 5 may be used in lieu of the cylindrical spring 8 in the rotation displaying device shown in FIGS. 1 and 2. The use of this conical spring 8' provides an advantage which will be described presently.

As will be clear from the above description, the displacement of the movable unit 12 is restricted by the cylindrical spring 8. Thus, the displaceable stroke of the movable unit 12 is limited to an amount corresponding to the difference between the distance A in FIG. 1 and the axial length of the cylindrical spring 8 in its fully compressed state in which the spring turns are substantially brought into intimate contact with each other. In the structure using the cylindrical spring 8, therefore, the displaceable stroke of the movable unit 12 is limited to the above distance. However, the conical spring 8' having a shape as shown in FIG. 5 can be compressed or flattened to an axial length substantially equal to the outer diameter B of the material forming the same when a load is imparted thereto. Therefore, the axial length of the conical spring 8' in its fully compressed or flattened state is greatly shorter than that of the cylindrical spring 8 although these springs have the same axial length in their no-loaded state. The displaceable stroke of the movable unit 12 can therefore be greatly increased when the conical spring 8' having such a feature is used as the means for restricting the displacement of the movable unit 12 in the rotation displaying device of the present invention.

Further, the spring used for restricting the displacement of the movable unit 12 may comprise the combination of a conical spring and a cylindrical spring. This is advantageous in that the spring characteristics peculiar to these springs can be exhibited.

In the rotation displaying device shown in FIGS. 1 and 2, it is important to determine the point at which the force imparted to the movable unit 12 by the spring 8 is balanced with the load imparted to the spring 8 by the movable unit 12 urged by the centrifugal force, in order that the green mark 19 indicating the rotation of the engine at the standard speed appears exactly completely in the displaying opening 15 of the display plate 14.

Adjustment for ensuring the accurate display of the engine rotation at the standard speed may be made by suitably bending the supporting lug 4b on the rotary plate 4 or inserting a suitable sleeve between the spring 8 and the supporting lug 4b thereby varying the initial state of compression of the spring 8. However, such a manner of adjustment is defective, among others, in that the desired balance is extremely difficult to attain, and the adjustable range is quite narrow.

A manner of adjustment as shown in FIG. 6 is preferably employed in the present invention. The rotation displaying device is mounted on a suitable rotary machine, and the rotary plate 4 shown in FIG. 2 is rotated at a speed corresponding to the standard speed of the rotary body such as the combine harvester engine for which the rotation displaying device is to be provided. While rotating the rotary plate 4 at the speed corresponding to the standard speed of the engine, a suitable marking means such as a pen is used to manually put a dot on the upper surface of the color pattern plate 11 at a point 0 which registers with the center of the displaying opening 15 of the display plate 14, as shown in FIG. 6. After putting the dot at the point 0 on the color pattern plate 11, the rotation of the rotary plate 4 is stopped, and the green mark 19 indicating the engine rotation at the standard speed is provided on the dotted portion. More precisely, this adjusting method comprises rotating the rotary plate 4 at a speed corresponding to the standard speed of the engine, moving the color pattern plate 11 from a position X (where the rotating speed is zero) to another position Y as shown in FIG. 6 by the centrifugal force proportional to the rotation at the above speed, using a suitable marking means such as a pen to manually put a simple dot on the color pattern plate 11 through the displaying opening 15 of the display plate 14 at a point 0 which registers with the center of the displaying opening 15, and after stopping the rotation of the rotary plate 4, bonding or coating the green mark 19 to the dotted point 0 to indicate the engine rotation at the standard speed.

The method above described is advantageous in that the green mark 19 indicating the engine rotation at the standard speed can be applied with a single step of adjustment without the necessity for varying the prestressed state of the spring 8. The dot can be simply put by a marking means such as a pen as above described. During the rotation of the rotary plate 4 in a direction as shown by the arrow C in FIG. 6, the holder holding the pen may put the dot at a point D although the point 0 is the correct center of the green mark 19 indicating the engine rotation at the standard speed. In such a case, the dot depicted by the pen describes a circle around the point 0 as shown by the arrow E in FIG. 6. Thus, the green mark 19 indicating the rotation of the engine at the standard speed can be accurately applied even when the point marked with the pen may be slightly displaced from the point 0.

The red mark 20 indicating the rotation of the engine at the high speed is similarly provided on the surface of the color pattern plate 11. Practical steps of applying the green mark 19 and red mark 20 comprise putting a dot for the green mark 19, rotating the rotary plate 4 at a speed higher than that corresponding to the standard speed, putting a dot for the red mark 20, and after stopping the rotation of the rotary plate 4, applying the green and red marks 19 and 20 to the respective dotted portions of the color pattern plate 11.

What is claimed is:

1. A rotation displaying device comprising a rotary shaft to be rotated at a speed proportional to the rotating speed of a rotary body such as an engine, a rod supported by and extending between end lugs on a rotary plate mounted on one end of said rotary shaft to extend in orthogonal relation to the axis of said rotary shaft, a color pattern plate mounted slidably on said rod through spring means to have sliding movement along said rod by being urged radially outwardly by the centrifugal force produced as a result of rotation of said rotary shaft, and a display plate disposed in parallel to said color pattern plate and having a single central opening therein, said color pattern plate being provided on its surface with a pattern of three different colors in different radial positions on such pattern plate and representing a first speed, a second speed and a third speed respectively of said rotary body, whereby the rotating speed of said rotary body is displayed by the change in the color pattern viewed through said single central opening of said display plate, said color pattern plate being mounted on a tube that is in slidable engagement with said rod and is slidable together with a balancing member as a unit along said rod to indicate speed, and said color pattern plate being in the form of an L-shaped member which is fixed to said tube with its long arm extending parallel to said rod and with its short arm slidably and rotatably engaging said tube and extending towards and terminating adjacent said rotary plate to limit arcuate movement of said color pattern plate in relation to said rotary plate.

2. A rotation displaying device as claimed in claim 1, wherein said short arm of said L-shaped member is relatively wide and it extends to an area close enough to said rotary plate to contact the same on short arcuate movement of said L-shaped member about said rod.

* * * * *